United States Patent Office 3,549,702
Patented Dec. 22, 1970

3,549,702
OXIMIDOMETHANESULFONAMIDES
Bernard Loev, Broomall, Pa., assignor to Smith Kline & French Laboratories, Philadelphia, Pa., a corporation of Pennsylvania
No Drawing. Continuation-in-part of application Ser. No. 583,067, Sept. 29, 1966. This application Oct. 5, 1967, Ser. No. 672,998
Int. Cl. C07c *143/80*
U.S. Cl. 260—556
6 Claims

ABSTRACT OF THE DISCLOSURE

N,N-disubstituted-oximidomethanesulfonamides and O-substituted oximido compounds are prepared by reducing a nitromethanesulfonamide or by converting a N,N-disubstituted-methanesulfonamide to the carbanion, then treating with a nitrite ester and, optionally, further reacting the oximido compounds to prepare the O-substituted oximido compounds. The compounds are useful as emulsifying agents, plasticizers, for treating rubber, leather, paper and oil and as herbicides and antibacterials and, in addition, the O-unsubstituted oximido compounds are useful as chelating agents and the $\alpha$-oximido-$\alpha$-toluene-sulfonamides have diuretic activity.

---

This application is a continuation-in-part of Ser. No. 583,067 filed Sept. 29, 1966, now U.S. Pat. 3,480,636.

This invention relates to new oximidomethanesulfonamides and to new nitromethanesulfonamides which are intermediates for preparing the oximido compounds.

The oximidomethanesulfonamides of this invention are represented by the following formula:

$$R_1-\underset{\underset{\text{NOR}_2}{\|}}{C}-SO_2-N\begin{matrix}R_3\\ \\R_4\end{matrix}$$

in which:

$R_1$ is alkyl having 1 to 6 carbon atoms, phenyl, halophenyl, lower alkylphenyl, lower alkoxyphenyl or trifluoromethylphenyl;

$R_2$ is hydrogen, lower alkyl, lower alkanoyl or di-lower alkylamino—$(CH_2)_n$ in which $n$ is 2 or 3;

$R_3$ is hydrogen or lower alkyl and $R_4$ is hydrogen, lower alkyl, benzyl, phenethyl or phenyl.

The terms "lower alkyl," "lower alkoxy" and "lower alkanoyl" as used herein denote groups having 1 to 4 carbon atoms.

The oximidomethanesulfonamides of Formula I are useful as emulsifying agents, plasticizers, for treating rubber, leather, paper and oil and as herbicides and antibacterials. In addition, the compounds of Formula I in which $R_2$ is hydrogen, that is the O-unsubstituted oximido compounds, are useful as chelating agents. The compounds of Formula I in which $R_1$ is phenyl have, in addition, diuretic activity as shown in the test in saline loaded rats at doses of 15 to 30 mg./kg. orally.

The oximido compounds of Formula I are prepared by the following procedures:

Formula II $$R_1-\underset{\underset{R_4}{}}{\overset{NO_2}{\underset{|}{CH}}}-SO_2-N\begin{matrix}R_3\\ \\R_4\end{matrix} \longrightarrow R_1-\underset{\underset{R_4}{}}{\overset{NOH}{\underset{\|}{C}}}-SO_2-N\begin{matrix}R_2\\ \\R_4\end{matrix} \longrightarrow$$

$$R_1-\underset{\underset{R_4}{}}{\overset{NOR'}{\underset{\|}{C}}}-SO_2-N\begin{matrix}R_3\\ \\R_4\end{matrix}$$

II.

$$R_1-CH_2-SO_2-N\begin{matrix}R''\\ \\R'''\end{matrix} \longrightarrow R_1-\overset{\ominus}{CH}-SO_2-N\begin{matrix}R''\\ \\R'''\end{matrix} \longrightarrow$$

$$R_1-\underset{\underset{R'''}{}}{\overset{NOH}{\underset{\|}{C}}}-SO_2-N\begin{matrix}R''\\ \\R'''\end{matrix} \longrightarrow R_1-\underset{\underset{R'''}{}}{\overset{NOR'}{\underset{\|}{C}}}-SO_2-N\begin{matrix}R''\\ \\R'''\end{matrix}$$

The terms $R_1$, $R_3$ and $R_4$ are as defined above, R' is lower alkyl, lower alkanoyl or di-lower alklamino—$(CH_2)_n$ in which $n$ is 2 or 3, R" is lower alkyl and R''' is lower alkyl, benzyl, phenethyl or phenyl.

According to procedure I, a nitromethanesulfonamide is reduced, for example, by catalytic hydrogenation or electrolytic reduction to give an oximidomethanesulfonamide.

The nitromethanesulfonamides of Formula II which are the starting materials for procedure I and which are also objects of this invention, are prepared as follows. A halonitromethane compound is reacted with an alkaline sulfurous acid solution to give a nitromethanesulfonic acid salt. This sulfonic acid salt is treated with a chlorinating agent and the resulting nitrosulfonic acid chloride is treated with an amine of the formula $$HN\begin{matrix}R_3\\ \\R_4\end{matrix}$$

to give the nitrosulfonamide starting materials. Alternatively, nitromethanesulfonamides in which $R_3$ and $R_4$ are other than hydrogen are prepared by treating the methanesulfonamide with a base, for example an alkali metal hydride such as potassium hydride, an alkyl lithium compound such as butyl lithium or, optionally, when $R_1$ is phenyl or substituted phenyl, a lower alkoxide such as sodium methoxide, to give the carbanion and treating the carbanion with a nitrate ester, such as a lower alkyl nitrate.

According to procedure II, which is the preferred procedure for the preparation of oximidomethanesulfonamides of this invention in which $R_3$ and $R_4$ are other than hydrogen, a methanesulfonamide is converted to the carbanion by treating with a base, for example, an alkali metal hydride such as potassium hydride, an alkyl lithium compound such as butyl lithium or, optionally, when $R_1$ is phenyl or substituted phenyl, a lower alkoxide such as sodium methoxide in a suitable solvent such as tetrahydrofuran. The carbanion is treated with a nitrite ester, for example a lower alkyl nitrite such as butyl nitrite, to give the oximidomethanesulfonamide.

The methanesulfonamide starting materials for procedure II are either known to the art or are prepared by chlorinating a methane compound or a carbinol to give the methyl chloride, then treating with thiourea, followed by chlorine to give the methanesulfonic acid chloride and treating with an amine.

The O-substituted oximidomethanesulfonamides are prepared by treating the O-unsubstituted compound with an alkylating agent for example a lower alkyl ester such as a lower alkyl halide or sulfate, an acylating agent such as a lower alkanoic anhydride or halide or a di-lower alkylaminoalkylating agent such as a di-lower alkyl-aminoalkyl halide for example the chloride, in the presence of a base.

The compounds of Formula I in which $R_2$ is hydrogen are written in the oximido form which is believed to be the form in which these compounds exist predominantly. However, these compounds may also exist in the nitroso form and both of these forms are intended to be included within this invention and covered by the claims presented hereinbelow.

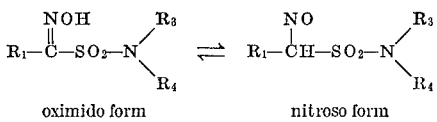

oximido form        nitroso form

The following examples are not limiting but are illustrative of the compounds of this invention and methods of preparing them.

EXAMPLE 1

To 200 ml. of dry tetrahydrofuran is added 20.4 g. of potassium hydride in 33% oil dispersion. N,N-dimethyl-α-toluenesulfonamide (94.0 g.) dissolved in 1 l. of dry tetrahydrofuran is added at a rate such that the temperature of the mixture does not rise above 40° C. (20 minutes). The mixture is stirred for 30 minutes at 25–30° C., then cooled to 10° C. To the stirred mixture at 10° C. is added 73 g. of n-butyl nitrite at such a rate that the temperature does not rise above 15° C. (30 minutes). The resulting mixture is stirred at room temperature for 3.5 hours. To the mixture is added 100 ml. of ethanol, then 1 l. of water. The mixture is concentrated in vacuo and the aqueous layer is washed with petroleum ether. Crushed ice is then added to the aqueous layer. Neutralizing with hydrochloric acid to pH 6–7 and then filtering gives N,N-dimethyl-α-oximido-α-toluenesulfonamide.

EXAMPLE 2

To a solution of 25 g. of N,N-dimethyl-α-oximido-α-toluenesulfonamide (prepared as in Example 1) in 500 ml. of 10% aqueous sodium hydroxide solution is added 150 ml. of dimethyl sulfate. The resulting mixture is stired for one hour at 25–30° C. and then extracted with methylene dichloride. The extracts are washed with water, dried over magnesium sulfate, concentrated in vacuo, cooled and filtered. The solid material is recrystallized from isopropyl ether to give N,N-dimethyl-α-(O-methyloximido)-α-toluenesulfonamide.

EXAMPLE 3

A solution of N,N-dimethyl-α-oximido-α-toluenesulfonamide (prepared as in Example 1) in 150 ml. of acetic anhydride is heated with stirring on a steam bath for 20 minutes, then concentrated in vacuo and allowed to stand at room temperature. Filtering and recrystallizing the solid material from isopropyl ether gives α-(O-acetyloximido)-N,N-dimethyl-α-toluenesulfonamide.

EXAMPLE 4

To a solution of 10 g. of N,N-dimethyl-α-oximido-α-toluenesulfonamide (prepared as in Example 1) in 100 ml. of dry tetrahydrofuran is added 2.5 g. of sodium methoxide. The mixture is stirred at room temperature for one hour. To the mixture is added 8.1 g. of N,N-dimethylaminopropyl chloride at room temperature with stirring over a five minute period and the resulting mixture is heated at reflux for 12 hours. The mixture is filtered and the filtrate is concentrated in vacuo. The residue is treated with ethereal hydrogen chloride to give, after filtering, N,N - dimethyl-α-{O-[3-(N,N-dimethylamino)propyl]oximido}-α-toluenesulfonamide.

By the same procedure, using N,N-dimethylaminoethyl chloride, the product is N,N - dimethyl-α-{O-[2-(N,N-dimethylamino)ethyl]oximido}-α-toluenesulfonamide.

EXAMPLE 5

By the procedure of Example 1, using N,N-dibutyl-α-toluenesulfonamide in place of N,N-dimethyl-α-toluenesulfonamide, there is obtained N,N-dibutyl-α-oximido-α-toluenesulfonamide.

Similarly, using N,N-diethyl-α-toluenesulfonamide, the product is N,N - diethyl-α-oximido-α-toluenesulfonamide.

By the same procedure using N-isobutyl-N-methyl-α-toluenesulfonamide the product is N-isobutyl-N-methyl-α-oximido-α-toluenesulfonamide.

EXAMPLE 6

A solution containing 16.1 g. of o-chlorobenzyl chloride and 7.4 g. of thiourea in 100 ml. of ethanol is refluxed for five hours. On cooling, the precipitate is filtered off and dissolved in 500 ml. of 50% aqueous acetic acid. Chlorine is bubbled into the solution while maintaining the temperature at 15° C. until the solution is saturated. Adding water, extracting with ether and concentrating the extract gives o-chloro-α-toluenesulfonyl chloride which is added to 100 ml. of aqueous dimethylamine with stirring. After stirring for two hours, then filtering, o-chloro-N,N-dimethyl-α-toluenesulfonamide is obtained.

By the procedure of Example 1, using the above prepared o-chloro-N,N-dimethyl-α-toluenesulfonamide, there is obtained o-chloro-N,N-dimethyl-α-oximido-α-toluenesulfonamide.

EXAMPLE 7

By the procedure of Example 6, using N-methylaniline in place of dimethylamine, the product is o-chloro-N-methyl-α-oximido-N-phenyl-α-toluenesulfonamide.

EXAMPLE 8

By the procedure of Example 6, using in place of α,o-dichlorotoluene the following:

p-bromo-α-chlorotoluene
α-chloro-m-fluorotoluene
α-chloro-p-xylene
p-butyl-α-chlorotoluene
p-chloromethylanisole
m-chloromethylphenetole
propyl α-chloro-p-tolyl ether
butyl α-chloro-p-tolyl ether the products are, respectively:

p-bromo-N,N-dimethyl-α-oximido-α-toluenesulfonamide
m-fluoro-N,N-dimethyl-α-oximido-α-toluenesulfonamide
N,N,p-trimethyl-α-oximido-α-toluenesulfonamide
p-butyl-N,N-dimethyl-α-oximido-α-toluenesulfonamide
p-methoxy-N,N-dimethyl-α-oximido-α-toluenesulfonamide
m-ethoxy-N,N-dimethyl-α-oximido-α-toluene-sulfonamide
N,N-dimethyl-α-oximido-p-propoxy-α-toluenesulfonamide
p-butoxy-N,N-dimethyl-α-oximido-α-toluenesulfonamide.

EXAMPLE 9

Anhydrous zinc chloride (136 g.) is dissolved in 105 g. of hydrochloric acid. To 100 ml. of this solution is added 10 g. of p-trifluoromethylbenzyl alcohol (prepared by reduction of p-trifluoromethylbenzoic acid with diborane in tetrahydrofuran). After stirring for 30 minutes, the organic layer which is p-trifluoromethylbenzyl chloride is removed.

Using p-trifluoromethylbenzyl chloride in the procedure of Example 6, N,N-dimethyl-p-trifluoromethyl-α-toluenesulfonamide is obtained.

By the procedure of Example 1, using the above prepared N,N-dimethyl-p-trifluoromethyl - α - toluenesulfonamide, the product is N,N-dimethyl-α-oximido-p-trifluoromethyl-α-toluenesulfonamide.

Similarly, using m-trifluoromethylbenzyl chloride in the procedure of Example 6, there is obtained N,N-dimethyl-m-trifluoromethyl-α-toluenesulfonamide which is reacted by the procedure of Example 1 to give N,N-dimethyl-α-oximido-m-trifluoromethyl-α-toluenesulfonamide.

EXAMPLE 10

Ethyl iodide (50 g.) is added to a solution of 25 g. of N,N-dimethyl-α-oximido-α-toluenesulfonamide in 500 ml.

of 10% aqueous sodium hydroxide solution. The resulting mixture is stirred at room temperature for one hour, then extracted with ether. The ethereal solution is dried and concentrated to give α-(O-ethyloximido)-N,N-dimethyl-α-toluenesulfonamide.

Similarly, using butyl bromide in place of ethyl chloride in the above procedure, the product is α-(O-butyloximido)-N,N-dimethyl-α-toluenesulfonamide.

EXAMPLE 11

A mixture of 23 g. of N,N-dimethyl-α-oximido-α-toluenesulfonamide (prepared as in Example 1) and 9.3 g. of propionyl chloride in 50 ml. of pyridine is heated on a steam bath for 30 minutes, then diluted with water. The solution is extracted with ether. The organic layer is rinsed with dilute hydrochloric acid, then dried and concentrated to give N,N-dimethyl-α-(O-propionyloximido)-α-toluenesulfonamide.

Similarly, using valeryl chloride in place of propionyl chloride, the product is N,N-dimethyl-α-(O-valeryl-oximido)-α-toluenesulfonamide.

EXAMPLE 12

1-chloro-1-nitroethane (60 g.) in 120 ml. of methanol is added to 69 g. of sodium sulfite in 225 ml. of water. The resulting mixture is heated at reflux for 24 hours, then concentrated to dryness. The residue is extracted with hot methanol; the extracts are concentrated to dryness to give sodium α-nitroethanesulfonate.

Sodium α-nitroethanesulfonate (118 g.) is suspended in 1 l. of phosphorus oxychloride. The mixture is stirred while 154 g. of phosphorus pentachloride is added. The resulting mixture is refluxed on the steam bath for 5–6 hours, then cooled and filtered. The filtrate is concentrated, keeping the temperature below 40° C. The residue is slurried with ether and filtered. The filtrate is concentrated keeping the temperature below 40° C. and the residue is distilled under high vacuum to give α-nitroethanesulfonyl chloride.

N-methylaniline (1.85 g.) and 2.3 g. of N,N-dimethylaniline are dissolved in dry chloroform. The mixture is stirred and chilled to 5° C. A solution of 3 g. of α-nitroethanesulfonyl chloride in chloroform is added dropwise, keeping the temperature below 5° C. The resulting mixture is stirred in an ice bath for 1.5 hours, then left in the ice bath to come to room temperature and stirred overnight. The mixture is concentrated to dryness and the residue is stirred with water, acidified with hydrochloric acid and extracted with chloroform and ether. The organic layer is dried and concentrated and the residue is distilled to give N-methyl-α-nitro-N-phenylethanesulfonamide.

Two grams of N-methyl-α-nitro-N-phenylethanesulfonamide is electrolytically reduced at −1.1 v. (saturated calomel electrode) in 200 ml. of methanol 0.1 N hydrochloric acid using a mercury cathode and separating the catholyte from the anolyte with an alundum diaphram. The reduction is allowed to proceed for 20 hours. The solution is then concentrated under an air stream. Filtering off the solid material and recrystallizing it from isopropyl ether gives N-methyl-α-oximido-N-phenylethanesulfonamide.

EXAMPLE 13

Phenethylamine (5.2 g.) and 5.75 g. of N,N-dimethylaniline are dissolved in dry chloroform. The solution is chilled to 5° C. and 7.5 g. of α-nitroethanesulfonyl chloride (prepared as in Example 12) dissolved in chloroform is added dropwise with stirring, keeping the temperature below 5° C. The mixture is stirred in ice for two hours, then overnight at room temperature.

The mixture is filtered and the filtrate is concentrated in vacuo, slurried with water, made basic with sodium hydroxide and extracted with dichloromethane. The organic layer is dried, concentrated and extracted with isopropyl ether. The extracts are concentrated and chilled. The resulting solid is filtered off and recrystallized from isopropyl ether to give α-nitro-N-phenethylethanesulfonamide.

Electrolytic reduction of the above prepared α-nitro-N-phenethylethanesulfonamide by the procedure of Example 12 gives α-oximido-N-phenethylethanesulfonamide.

EXAMPLE 14

Chloronitromethane (9.5 g.) in 50 ml. of methanol is added to 11.6 g. of ammonium sulfite in 60 ml. of water and the resulting mixture is heated at reflux for 10 hours. After working up as in Example 12, ammonium nitromethanesulfonate is obtained.

A mixture of 5 g. of ammonium nitromethanesulfonate, 9 g. of phosphorus pentachloride and 50 ml. of phosphorus oxychloride is heated on a steam bath for six hours to give, after working up as in Example 12, nitromethanesulfonyl chloride.

A solution of 3 g. of nitromethanesulfonyl chloride in 25 ml. of chloroform is added dropwise to 0.9 g. of dimethylamine and 2.1 g. of N,N-dimethylaniline in 50 ml. of chloroform at 5° C. The resulting mixture is stirred in an ice bath for 1.5 hours, then left in the ice bath to come to room temperature and stirred overnight. Working up as in Example 12 gives N,N-dimethylnitromethanesulfonamide.

Electrolytic reduction in methanol 0.1 N hydrochloric acid by the procedure of Example 12 gives N,N-dimethyloximidomethanesulfonamide.

EXAMPLE 15

1-butanesulfonyl chloride (10 g.) is added to 25 ml. of aqueous dimethylamine with stirring. The resulting mixture is stirred for two hours, then filtered to give N,N-dimethyl-1-butanesulfonamide.

By the procedure of Example 1, using the above prepared N,N-dimethyl-1-butanesulfonamide, there is obtained N,N-dimethyl-1-oximido-1-butanesulfonamide.

Similarly, using 1-hexanesulfonyl chloride, the product is N,N-dimethyl-1-oximido-1-hexanesulfonamide.

EXAMPLE 16

Chlorine gas is passed into a solution of α-nitrotoluene in dilute aqueous sodium hydroxide solution at room temperature for 25 minutes. The oil that separates is α-chloro-α-nitrotoluene.

A mixture of 20 g. of α-chloro-α-nitrotoluene and 16.5 g. of sodium sulfite in 250 ml. of methanol is heated at reflux for 24 hours. Concentrating to dryness, extracting the residue with hot methanol and concentrating the extracts gives sodium α-nitro-α-toluenesulfonate.

Sodium α-nitro-α-toluenesulfonate (22.2 g.) is carefully added to a solution containing 1.8 ml. of dimethylformamide in 50 ml. of thionyl chloride cooled to 5° C. The mixture is stirred at 60° C. for 15 minutes, then concentrated in vacuo, stirred with ether and filtered. The filrate is concentrated to give α-nitro-α-toluenesulfonyl chloride.

To a solution of 2.0 g. of ammonia and 12 g. of N,N-dimethylaniline in dry chloroform is added dropwise a solution of 23 g. of α-nitro-α-toluenesulfonyl chloride in chloroform at 5° C. The mixture is stirred in an ice bath for two hours, then left in the ice bath to come to room temperature and stirred overnight. Working up as in Example 12 gives α-nitro-α-toluenesulfonamide.

Electrolytic reduction in methanol 0.1 N hydrochloric acid by the procedure of Example 12 gives α-oximido-α-toluenesulfonamide.

Reacting methylamine with α-nitro-α-toluenesulfonyl chloride by the above procedure gives N-methyl-α-nitro-α-toluenesulfonamide which is reduced electrolytically by the procedure of Example 12 to give N-methyl-α-oximido-α-toluenesulfonamide.

Similarly, reacting N-methylbenzylamine with α-nitro-α-toluenesulfonamide which is reduced electrolytically to give N-benzyl-N-methyl-α-oximido-α-toluene- α-toluenesulfonyl chloride gives N-benzyl-N-methyl-α-sulfonamide.

What is claimed is:
1. A compound of the formula:

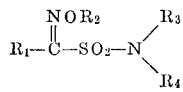

in which:
$R_1$ is alkyl having 1 to 6 carbon atoms, phenyl, halophenyl, lower alkylphenyl, lower alkoxyphenyl or trifluoromethylphenyl;
$R_2$ is hydrogen, lower alkyl, lower alkanoyl or di-lower alkylamino-$(CH_2)_n$ in which $n$ is 2 or 3;
$R_3$ is hydrogen or lower alkyl and
$R_4$ is hydrogen, lower alkyl, benzyl, phenethyl or phenyl.

2. A compound according to claim 1 in which $R_1$ is phenyl, $R_2$ is hydrogen and $R_3$ and $R_4$ are methyl, said compound being N,N-dimethyl-α-oximido-α-toluenesulfonamide.

3. A compound according to claim 1 in which $R_1$ is phenyl and $R_2$, $R_3$ and $R_4$ are methyl, said compound being N,N-dimethyl-α-(O-methyloximido)-α-toluenesulfonamide.

4. A compound according to claim 1 in which $R_1$ is phenyl, $R_2$ is acetyl and $R_3$ and $R_4$ are methyl, said compound being α-(O-acetyloximido)-N,N-dimethyl-α-toluenesulfonamide.

5. A compound according to claim 1 in which $R_1$ is phenyl, $R_2$ is 3-(N,N-dimethylaminopropyl) and $R_3$ and $R_4$ are methyl, said compound being N,N-dimethyl-α-{O-[3 - (N,N-dimethylamino)-propyl]oximido}-α-toluenesulfonamide.

6. A compound of the formula:

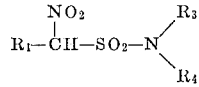

in which:
$R_1$ is alkyl having 1 to 6 carbon atoms, phenyl, halophenyl, lower alkylphenyl, lower alkoxyphenyl or trifluoromethylphenyl;
$R_3$ is hydrogen or lower alkyl and
$R_4$ is hydrogen, lower alkyl, benzyl, phenethyl or phenyl.

References Cited
UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |

OTHER REFERENCES

JACS, vol. 81, pp. 4937–38, September–October 1959, Teotino et al.

HENRY R. JILES, Primary Examiner

S. D. WINTERS, Assistant Examiner

U.S. Cl. X.R.

424—321